(12) United States Patent
Wu et al.

(10) Patent No.: US 12,504,145 B2
(45) Date of Patent: Dec. 23, 2025

(54) LIGHT SOURCE MODULE AND DISPLAY DEVICE

(71) Applicant: Radiant Opto-Electronics Corporation, Kaohsiung (TW)

(72) Inventors: Tsung-Tse Wu, Kaohsiung (TW); Yao-Wen Hsu, Kaohsiung (TW); Che-Chia Hsu, Kaohsiung (TW); Chun-Hsien Li, Kaohsiung (TW)

(73) Assignee: RADIANT OPTO-ELECTRONICS CORPORATION, Kaohsiung (TW)

( * ) Notice: Subject to any disclaimer, the term of this patent is extended or adjusted under 35 U.S.C. 154(b) by 0 days.

(21) Appl. No.: 18/966,971

(22) Filed: Dec. 3, 2024

(65) Prior Publication Data
US 2025/0116386 A1   Apr. 10, 2025

Related U.S. Application Data (63) Continuation of application No. PCT/CN2024/072600, filed on Jan. 16, 2024.

(30) Foreign Application Priority Data

Oct. 7, 2023   (CN) ............. 202311291272.7

(51) Int. Cl.
*F21S 43/50*   (2018.01)
*F21S 43/14*   (2018.01)
(Continued)

(52) U.S. Cl.
CPC .......... *F21S 43/50* (2018.01); *F21S 43/14* (2018.01); *F21S 43/26241* (2024.05); *H10H 29/142* (2025.01)

(58) Field of Classification Search
CPC .............................. G02F 1/133605
See application file for complete search history.

(56) References Cited

U.S. PATENT DOCUMENTS 5,819,454 A * 10/1998 Rosenitsch ............. G09F 9/33
362/240
11,760,253 B2 * 9/2023 Muegge ................ F21S 43/50
362/517
(Continued)

FOREIGN PATENT DOCUMENTS

CN       101457921 A    6/2009
CN       101832487 A    9/2010
(Continued)

OTHER PUBLICATIONS

Taiwan Office Action mailed Aug. 14, 2024 in counterpart Taiwan application TW 113101760, 6 pages in Chinese.
(Continued)

*Primary Examiner* — Eric T Eide
(74) *Attorney, Agent, or Firm* — Juan Carlos A. Marquez; Marquez IP Law Office, PLLC (57) ABSTRACT

A light source module is provided, including: a light board, including a substrate, and a plurality of light-emitting elements arranged at intervals on the substrate; and a separator, located above the substrate, and including a plurality of first ribs, where the plurality of first ribs is cross-connected to form a plurality of interval spaces, to accommodate the light-emitting elements, the first rib forming the interval space has an inner wall, a part of the inner wall in a direction closer to the substrate tapers in a direction far away from the interval space, the inner wall has a first distance farther away from the substrate in a Z-axis direction and has a second distance closer to the substrate, and a projection relationship between the second distance and the first distance onto an XY plane is that the second distance is greater than the first distance.

10 Claims, 11 Drawing Sheets

(51) Int. Cl.
*F21S 43/20* (2018.01)
*H10H 29/14* (2025.01)

(56) References Cited

U.S. PATENT DOCUMENTS

| | | | |
|---|---|---|---|
| 2010/0061087 A1* | 3/2010 | Stevens | G02F 1/133605 |
| | | | 362/97.3 |
| 2015/0204525 A1 | 7/2015 | Shen et al. | |
| 2021/0109405 A1 | 4/2021 | Horiguchi et al. | |

FOREIGN PATENT DOCUMENTS

| | | |
|---|---|---|
| CN | 212456766 U | 2/2021 |
| CN | 116088219 A | 5/2023 |
| JP | 2019197093 A | 11/2019 |
| KR | 1020220022910 A | 3/2022 |
| TW | 201413349 A | 4/2014 |
| TW | 202132876 A | 9/2021 |
| WO | 2007061033 A1 | 5/2007 |

OTHER PUBLICATIONS

PCT International Search Report mailed Jul. 4, 2024 in counterpar PCT application PCT/CN2024/072600, 8 pages in Chinese.

* cited by examiner

LIGHT SOURCE MODULE AND DISPLAY DEVICE

CROSS REFERENCE TO RELATED APPLICATIONS

This application is a continuation application of PCT Application No. PCT/CN2024/072600, filed on Jan. 16, 2024, which claims priority from China Patent Application Serial Number 202311291272.7, filed on Oct. 7, 2023. The entire contents of each of which are incorporated herein by reference.

BACKGROUND

Technical Field

The present invention mainly relates to a light source module, and in particular, to a light source module including a separator forming a clearance space in a Z-axis direction, and a display device applying the light source module.

Related Art

A front matrix display light for vehicle is formed by a plurality of high-brightness light-emitting diodes. It includes a separator for achieving partition light control to show different patterns or text.

A conventional front matrix display light for vehicle contains 350 to 400 light-emitting diodes for a 14-inch size. However, as an increasingly high demand for visual perception, the quantity of light-emitting diodes grows greatly. This has led to a much denser arrangement of the light-emitting diodes, resulting in significantly reduced spacing between them. Consequently, assembly tolerance have become more stringent. During assembly, the separator is now more likely to collide with the light-emitting diodes, potentially dislodging them.

In view of this, there is a need to provide a light source module, to resolve the foregoing problems.

SUMMARY

An objective of the present invention is to provide a light source module, to create a clearance space in a Z-axis direction to arrange a light-emitting diode. In this way, a separator and the light-emitting diode avoid interference to each other in all three axes (such as X-axis, Y-axis, and Z-axis), thereby reducing a requirement for assembly precision.

A next objective of the present invention is to provide a display device, including the foregoing light source module. The display device may be used in a matrix display light for vehicle, and has a good partition dimming performance.

To achieve the foregoing objectives, the present invention provides a light source module, including: a light board and a separator. The light board includes a substrate, and a plurality of light-emitting elements arranged at intervals on the substrate. The separator locates above the substrate and includes a plurality of first ribs, wherein the plurality of first ribs intersect and connect to each other to form a plurality of interval spaces to accommodate the light-emitting elements. The first rib forming the interval space has an inner wall, a part of the inner wall closer to the substrate is recessed away from the interval space. Along a Z-axis direction, the inner wall has a first distance farther away from the substrate and has a second distance closer to the substrate, and a projection relationship between the second distance and the first distance onto an XY plane is that the second distance is greater than the first distance.

In some embodiments, in the interval space, the separator further includes at least one second rib separating the interval space into a plurality of sub-interval spaces.

In some embodiments, the plurality of sub-interval spaces is in a triangular form.

In some embodiments, the first rib and the second rib are in contact with the substrate.

In some embodiments, the separator further includes a plurality of pads respectively arranged at the bottom of an intersection between any two first ribs, and a channel is formed between the plurality of pads to be in communication with the interval space.

In some embodiments, the pad has an extension portion extending below the interval space toward the adjacent light-emitting element.

In some embodiments, the pad of the separator is in contact with the substrate.

In some embodiments, the substrate includes a plurality of positioning recesses corresponding to the plurality of pads, and the plurality of pads is respectively engaged in the plurality of positioning recesses.

In some embodiments, the light-emitting element overlaps with the first rib in the Z-axis direction.

In some embodiments, the light source module in the present invention further includes a diffuse plate arranged above the separator.

In some embodiments, the separator further includes a positioning bump, the diffuse plate includes a dimple corresponding to the positioning bump, and the diffuse plate abuts against the positioning bump of the separator through the dimple.

The present invention further provides a display device, including the foregoing light source module; and a panel, arranged above the light source module.

The light source module and the display device in the present invention have the following characteristics: Through a design of wider interval spaces at the bottom of the separator, the plurality of light-emitting elements can be accommodated in interval spaces without colliding with the separator. In this way, it makes the separator and the light-emitting elements effectively avoid interference to each other in all three axes (such as X-axis, Y-axis, and Z-axis), and has a good partition dimming performance.

DETAILED DESCRIPTION

Embodiments of the present invention are described in detail below with reference to the accompanying drawings. The accompanying drawings are mainly simplified schematic diagrams, and only exemplify the basic structure of the present invention schematically. Therefore, only the elements related to the present invention are shown in the drawings, and are not drawn according to the quantity, shape, and size of the elements during actual implementation. During actual implementation, the specification and size of the elements are actually an optional design, and the layout of the components may be more complex.

The following description of various embodiments is provided to exemplify the specific embodiments of the present invention with reference to the accompanying drawings. The directional terms mentioned in the present invention, such as "above", "below", "front", and "back", merely refer to the directions in the accompanying drawings. Therefore, the used directional terms are intended to describe and understand this application, but are not intended to limit this application. In addition, in the specification, unless explicitly described as contrary, the word "include" is understood as including the element, but does not exclude any other elements.

Figure 1:
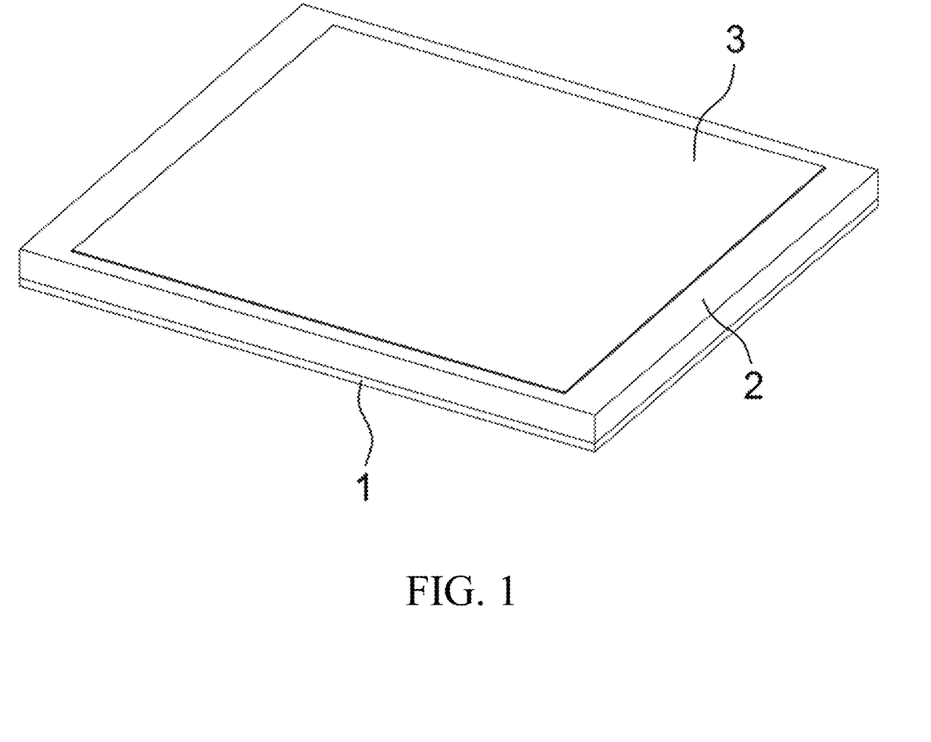
FIG. 1 is a three-dimensional combination view according to a first embodiment of the present invention.
Figure 2:
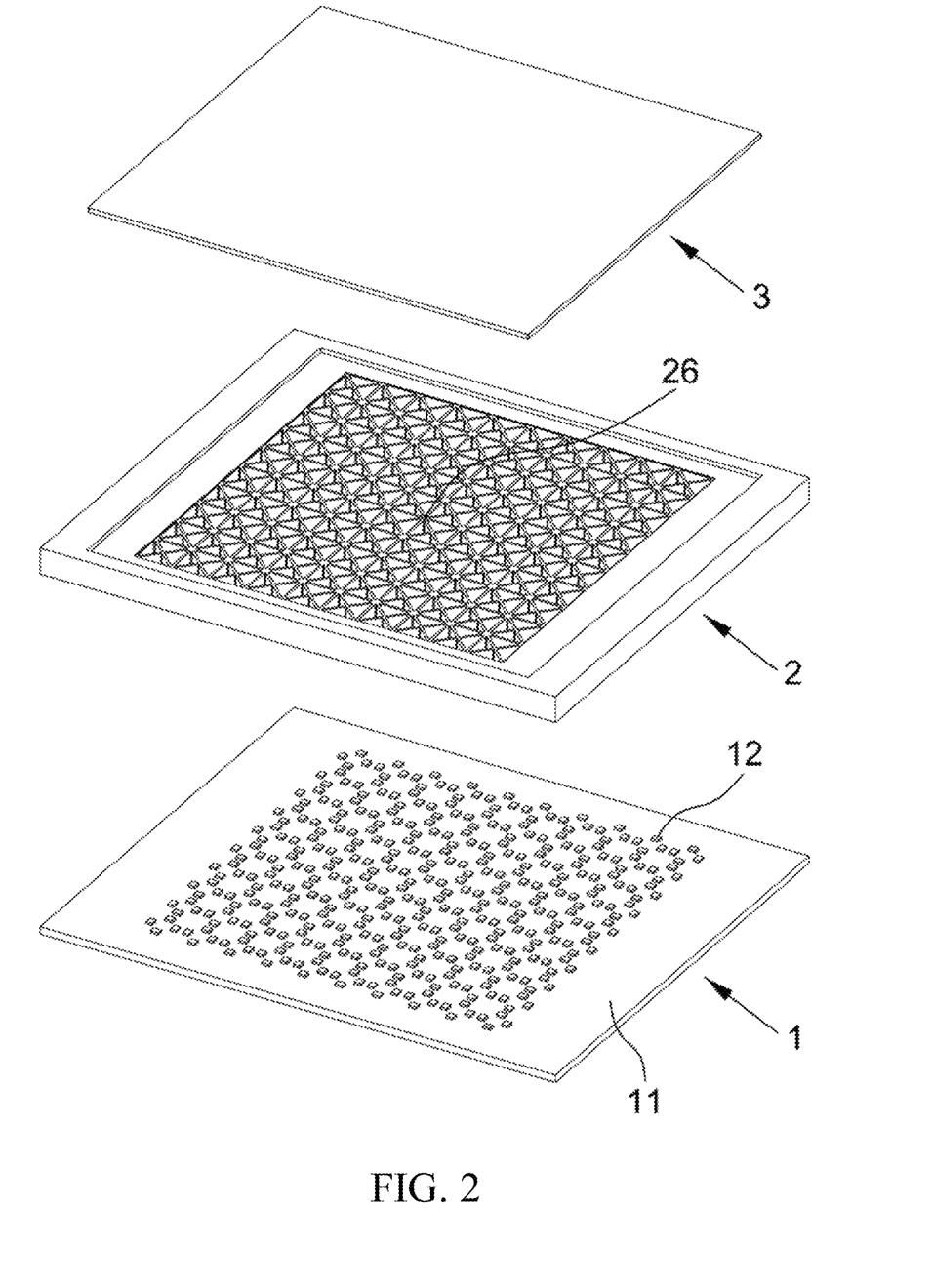
FIG. 2 is a three-dimensional exploded view according to a first embodiment of the present invention.
Figure 3:
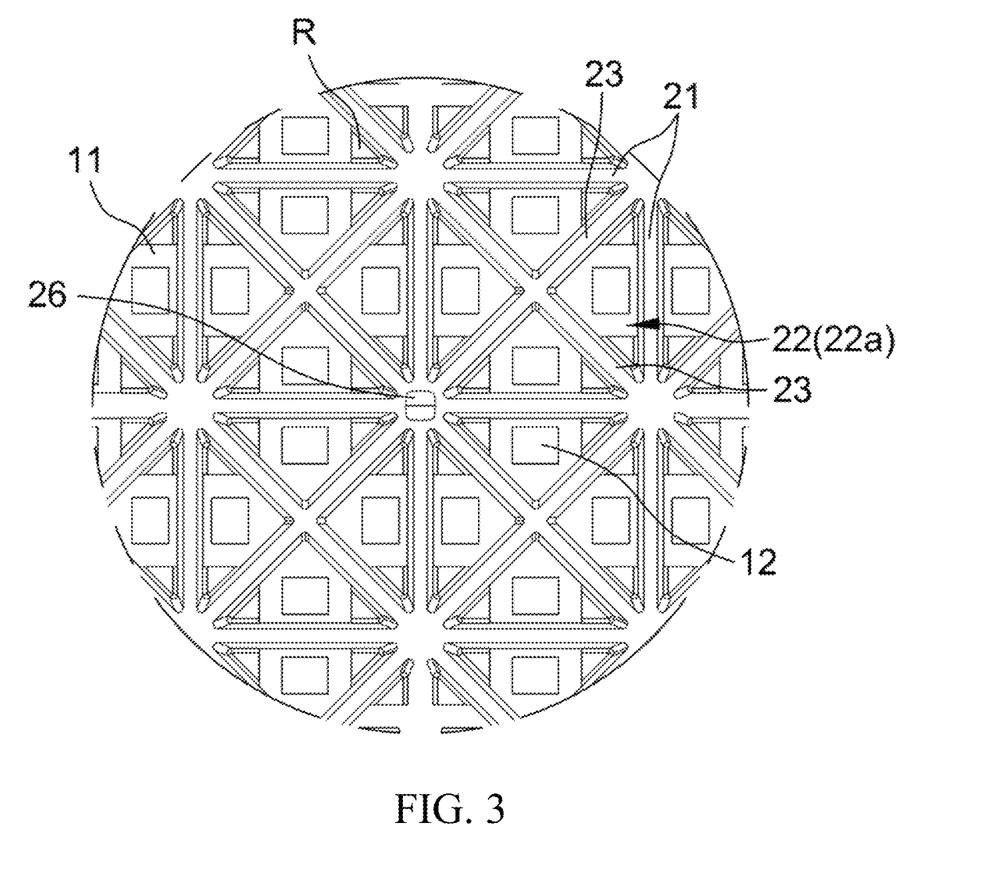
FIG. 3 is an enlarged partial top view of combining a separator to a light board according to a first embodiment of the present invention.

FIG. 1 and FIG. 2 are respectively a three-dimensional combination view and a three-dimensional exploded view according to a first embodiment of a light source module in the present invention. The light source module includes a light board 1 and a separator 2. The light board 1 includes a substrate 11, and a plurality of light-emitting elements 12 arranged at intervals on the substrate 11. In this embodiment, the light-emitting element 12 is a light-emitting diode.

Referring to FIG. 2, FIG. 3, FIG. 4, and FIG. 5, the separator 2 is located above the substrate 11, and includes a plurality of first ribs 21. The plurality of first ribs 21 intersect and connect to each other to form a plurality of interval spaces 22. The first rib 21 may be in contact with the substrate 11, and is configured to accommodate the light-emitting element 12. The first rib 21 has an inner wall 211 facing the interval space 22, and a part of the inner wall 211 closer to the substrate 11 is recessed away from the interval space 22. In this way, the inner wall 211 of the first ribs 21 defines the interval space 22 with a narrow upper and wide lower design. Therefore, along a Z-axis direction, the inner wall 211 has a first distance D1 farther away from the substrate 11 and has a second distance D2 closer to the substrate 11, and a projection relationship between the second distance D2 and the first distance D1 onto an XY plane is that the second distance D2 is greater than the first distance D1. In this way, a clearance space is formed in the Z-axis direction to accommodate the light-emitting element 12 to avoid collision between the first rib 21 of the separator 2 and the light-emitting element 12 in the Z-axis direction, and to achieve a demand about denser arrangement design of light-emitting elements. In addition, an entire light-emitting surface is partitioned by the plurality of first ribs 21 which forming the interval spaces 22. In this way, it makes a good partition dimming performance, and a requirement for an assembly tolerance of the separator 2 and the light-emitting element 12 in three axes (such as X-axis, Y-axis, and Z-axis) can be satisfied.

In the present invention, when the substrate 11 has a 14-inch size, a quantity of the plurality of light-emitting elements 12 arranged on the substrate 11 approximately 1800, it can achieve a denser arrangement design of the light-emitting elements through the design of the separator 2, thereby improving overall resolution of the light source module. The quantity of light-emitting elements 12 arranged on the substrate 11 may not be limited in the present invention.

Figure 4:
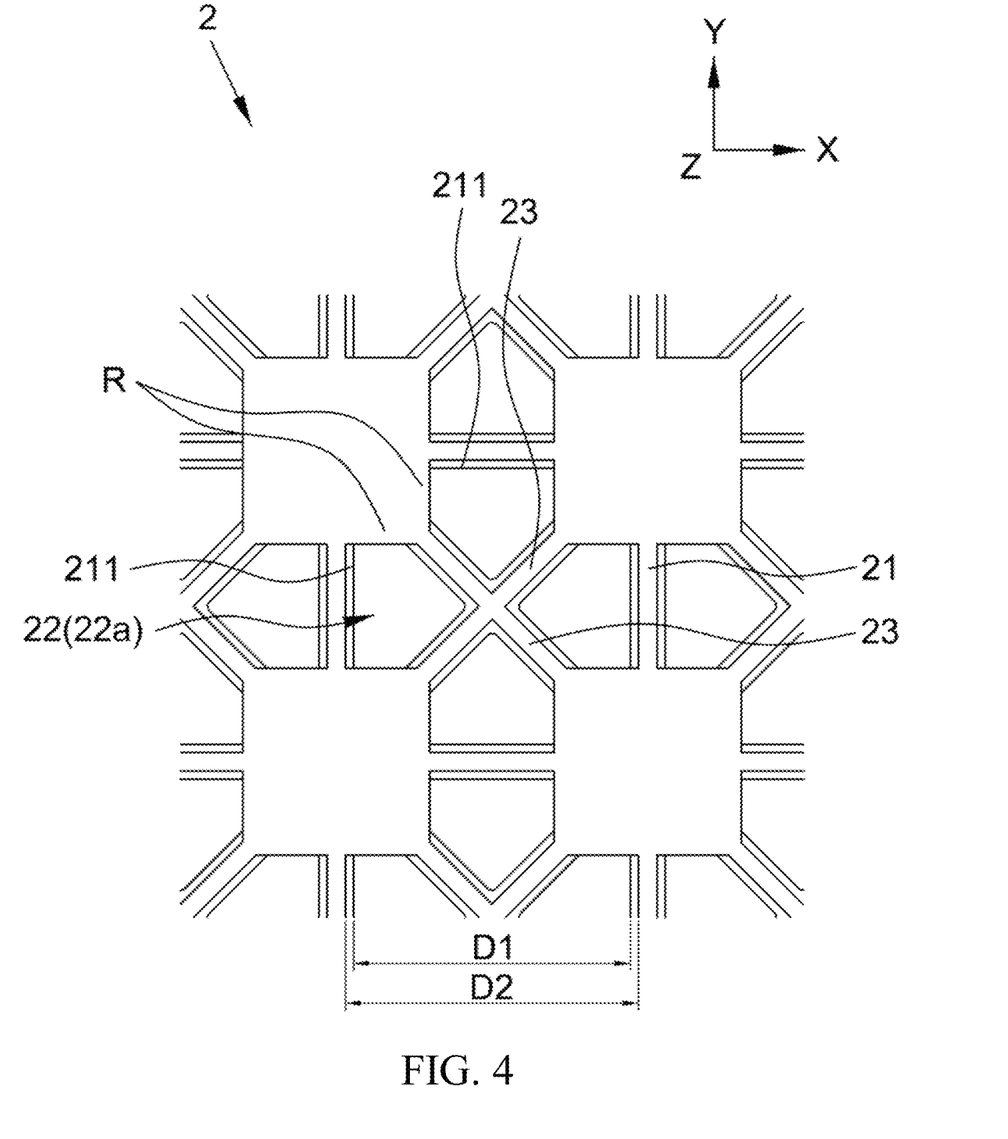
FIG. 4 is a bottom view of a separator according to a first embodiment of the present invention.
Figure 5:
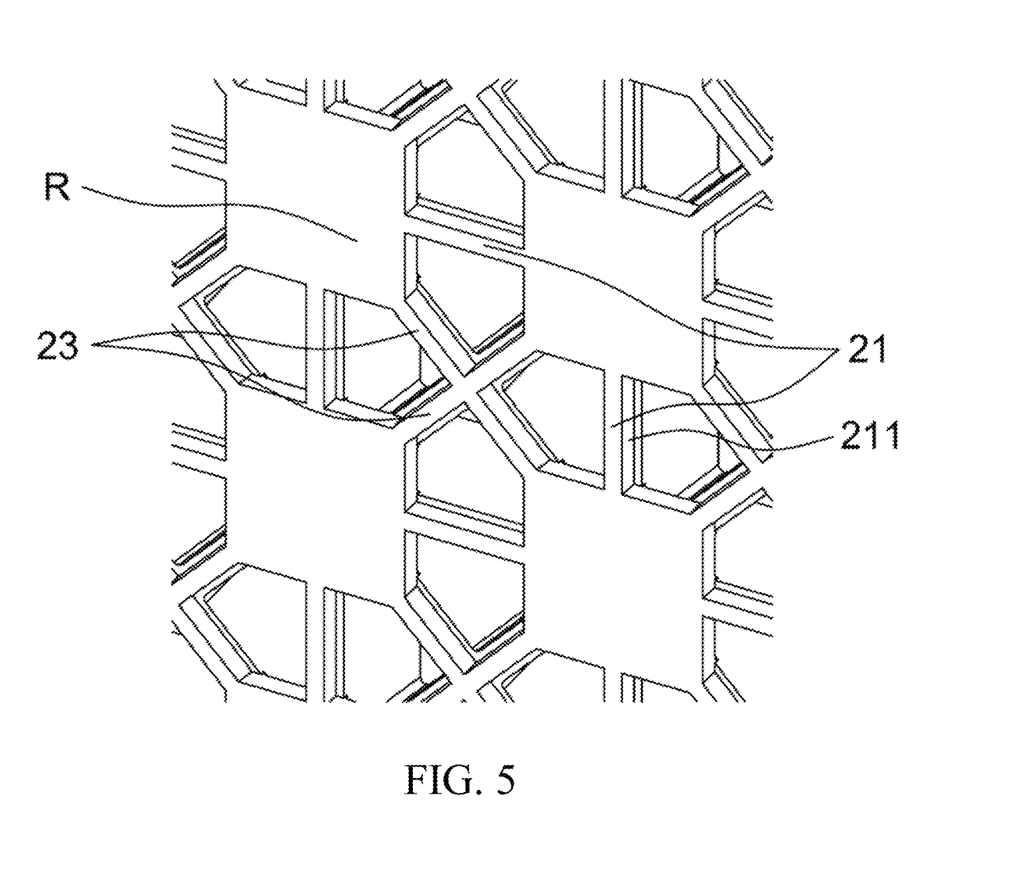
FIG. 5 is a three-dimensional view of FIG. 4 from another perspective.

Referring to FIG. 4 and FIG. 5, the separator 2 further includes at least one second rib 23 in the interval space 22. The second rib 23 may be in contact with the substrate 11, and separate the interval space 22 into a plurality of sub-interval spaces 22a. For example, the sub-interval space 22a can exhibit a triangle, a rectangle, a fan-shaped configuration, or the like. When the sub-interval space 22a is in the triangular form, the sub-interval space 22a can smooth out jagged edges of text or a pattern emitted by the light-emitting element 12, thereby achieving a higher precision effect, and improving precision of an image presented by the light source module.

Referring to FIG. 4 and FIG. 5, on a side closer to the substrate 11, a corner formed between the first rib 21 and the second rib 23 has an extension portion R extending below the interval space 22 and toward the adjacent light-emitting element 12. Therefore, the extension portion R can reflect light reflected by a diffuse plate back again, thereby improving uniformity of the light-emitting surface, and also can increase structural strength of the first rib 21 and the second rib 23, thereby making the entire separator 2 less prone to compression and deformation. In other embodiments, the extension portion R between the first rib 21 and the second rib 23 may alternatively be omitted.

Figure 6A:
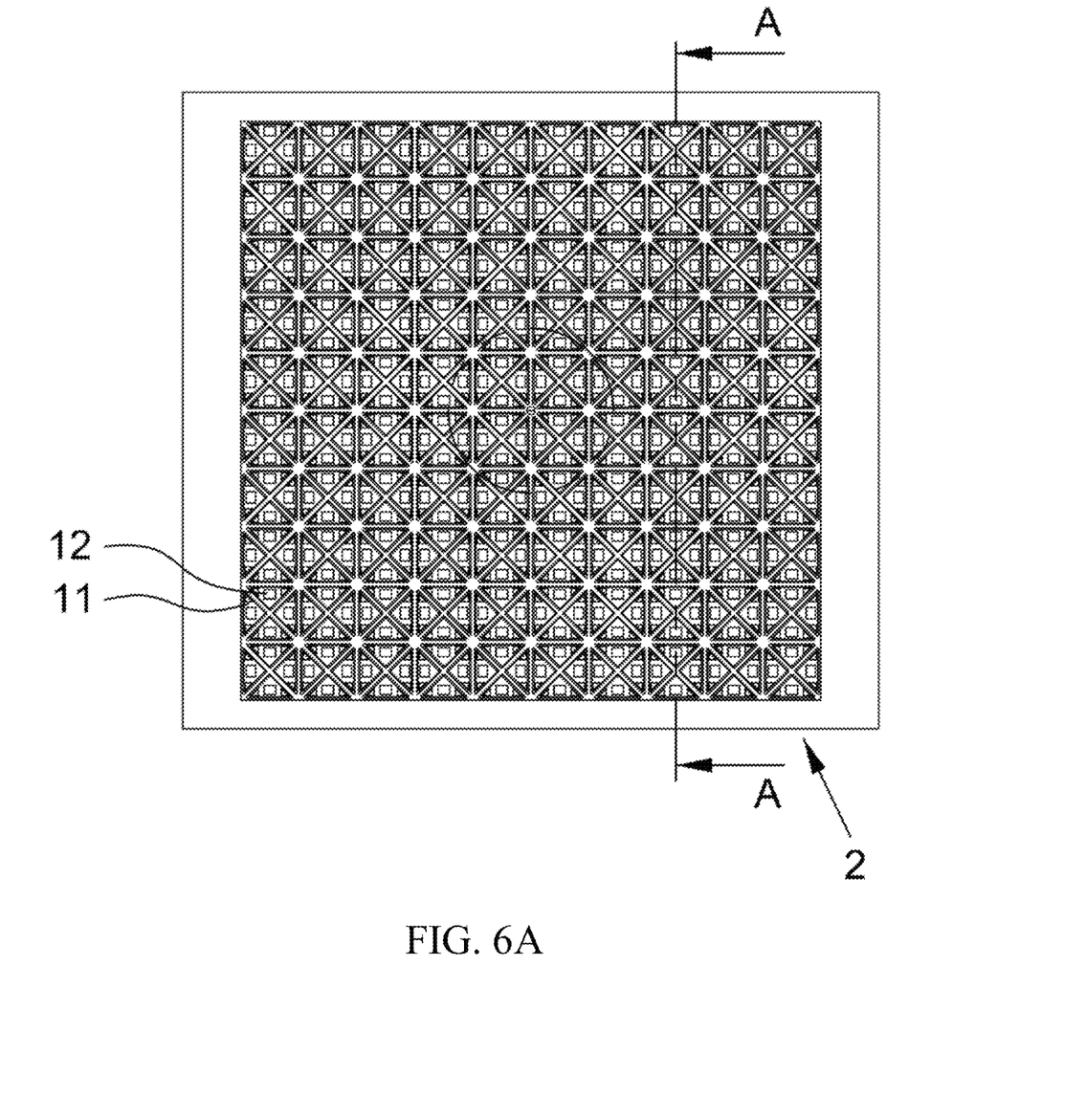
FIG. 6A is a top view of combining a separator to a light board according to a second embodiment of the present invention.
Figure 6B:
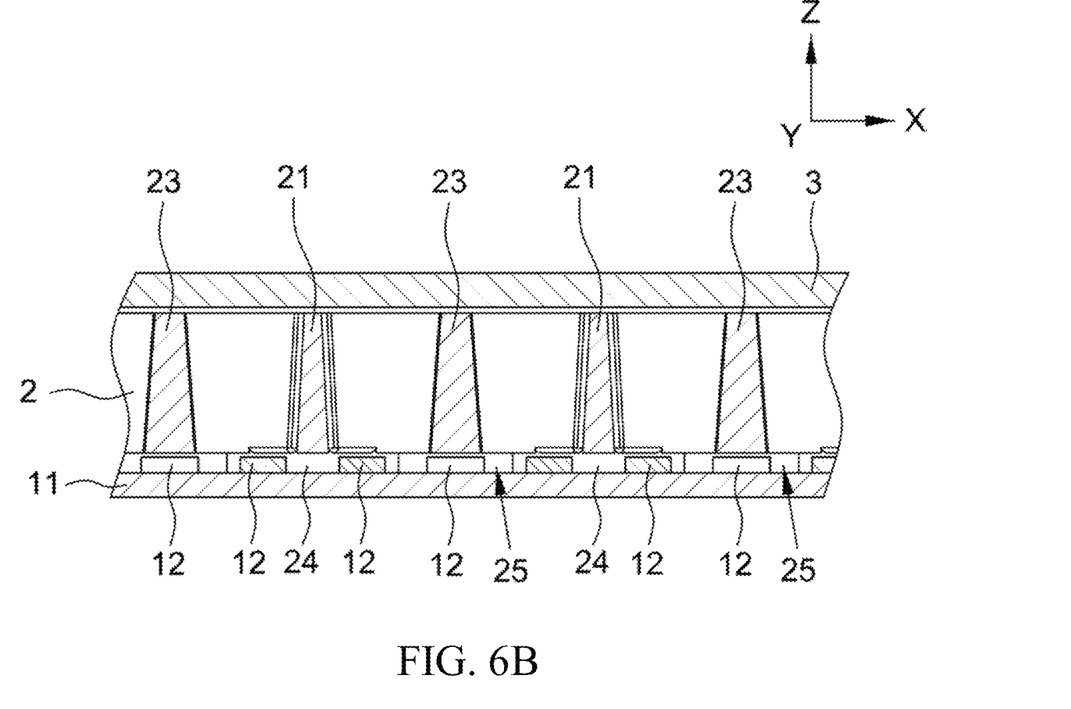
FIG. 6B is a cross-sectional side view of FIG. 6A along a line A-A.
Figure 7:
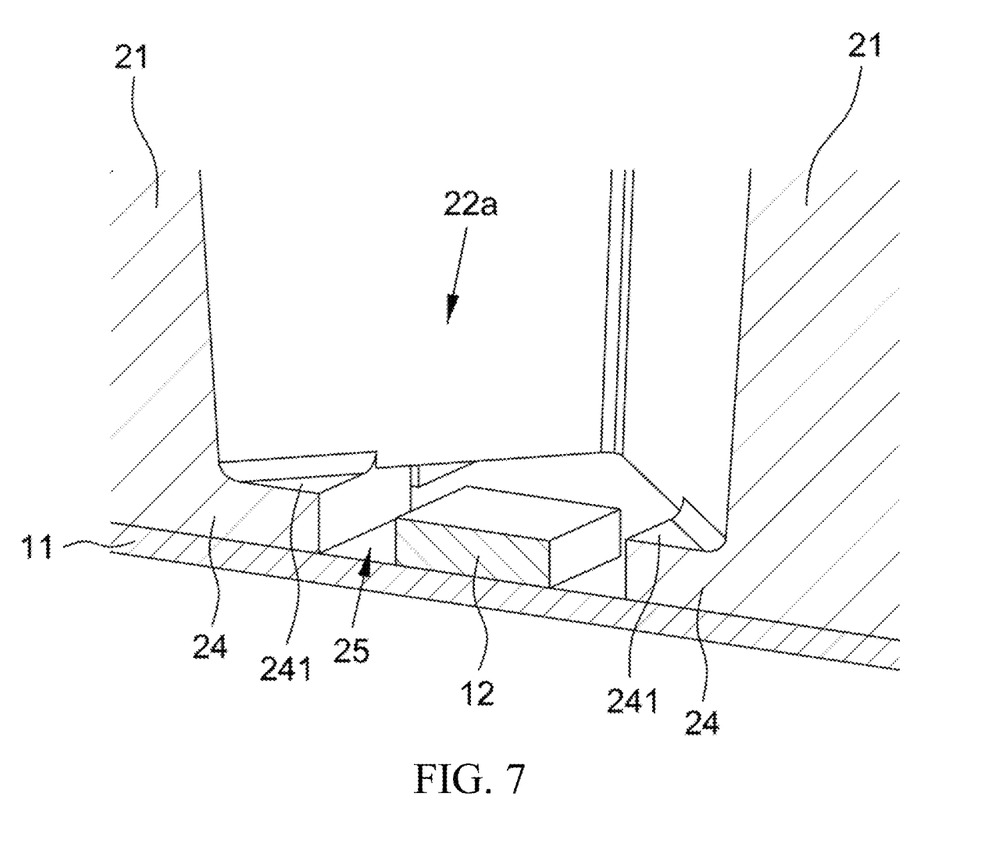
FIG. 7 is a three-dimensional view of combining a separator to a light board according to a second embodiment of the present invention.

FIG. 6A, FIG. 6B, and FIG. 7 are respectively a top view, a cross-sectional side view, and a three-dimensional view of a second embodiment of a light source module according to the present invention. The separator 2 further includes a plurality of pads 24 respectively arranged at the bottom of an intersection between any two first ribs 21. In other words, in this embodiment, the pad 24 may be in contact with the substrate 11, creating a gap distance (namely, a thickness of the pad 24) between the first ribs 21 and the substrate 11.

In this embodiment, the pad 24 may or may not exceed beyond a bottom edge of the intersection in the X-axis and Y-axis directions. In other words, when the pad 24 does not exceed beyond the bottom edge of the intersection in the X-axis and Y-axis directions, it can further increase an available space to avoid the separator 2 colliding with the light-emitting element 12 in the X-axis and Y-axis directions. For example, the pad 24 may be a cylinder with a diameter not exceeding a width of the first rib 21.

In addition, the pad 24 may also be beyond the bottom edge of the intersection in the X-axis and Y-axis directions. In other words, the pad 24 has an extension portion 241 beyond the bottom of the intersection, and the extension portion 241 corresponds to a corner between the first rib 21 and the second rib 23, and extends below the interval space 22 toward the adjacent light-emitting element 12. Therefore, the extension portion 241 can reflect light reflected by a diffuse plate back again, thereby improving uniformity of the light-emitting surface.

Figure 9:
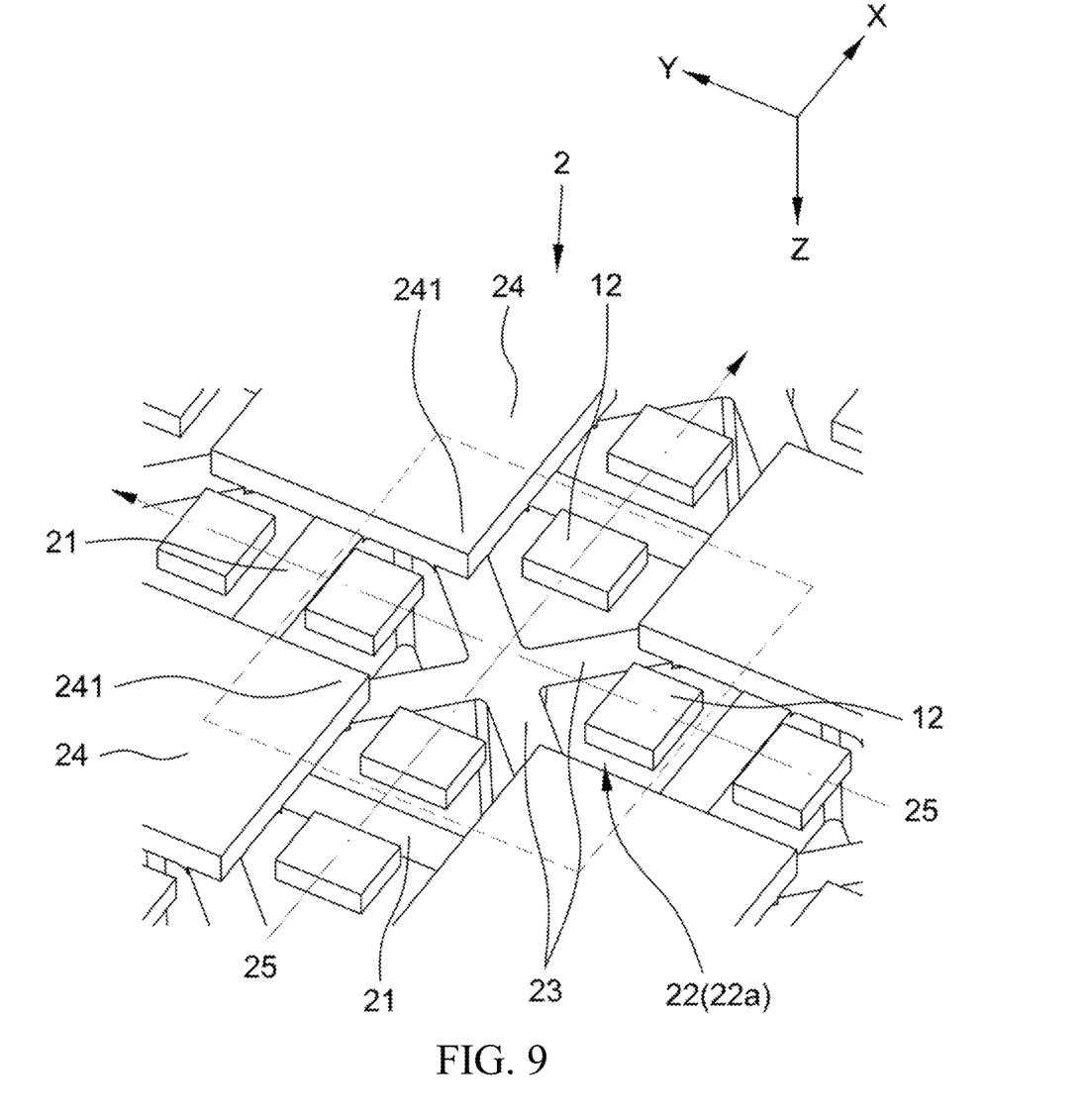
FIG. 9 is a bottom view of a light-emitting element and a separator according to a second embodiment of the present invention.

A channel 25 is formed between the plurality of pads 24 to be in communication with the interval space 22, and is configured to accommodate the light-emitting element 12. Referring to FIG. 9, a relative relationship between the separator 2 and the light-emitting element 12 is presented from an elevation perspective. The light-emitting element 12 is accommodated in the channel 25 formed by the pads 24 in the Z-axis direction. In this way, collision between the first rib 21 of the separator 2 and the light-emitting element 12 in the Z-axis direction can be further avoided. In addition, the channel 25 provide a clearance position in the Z-axis direction. In this way, a denser arrangement design of the light-emitting elements can be further overcome, and a requirement for an assembly tolerance of the separator 2 and the light-emitting element 12 in the X-axis, Y-axis, and Z-axis directions can be further satisfied. In an embodiment, both the first rib 21 and the second rib 23 are not in contact with the substrate 11, and both the first rib 21 and the second rib 23 are located above the light-emitting element 12 in the Z-axis direction. In this way, the light-emitting element 12 can use the channel 25 as a tolerance for overall assembly.

It is worth mentioning that, the first rib 21, the second rib 23, and the pad 24 of the separator 2 may be of an integrated structure. The extension portion 241 of the pad 24 has the same reflectivity as the first rib 21 and the second rib 23. This design helps to receive light not exiting the diffuse plate, and reflect the light upward after the light hits the extension portion 241, to improve a light reflection effect in the interval space 22, thereby strengthening brightness at the corner of the interval space 22.

Figure 8:
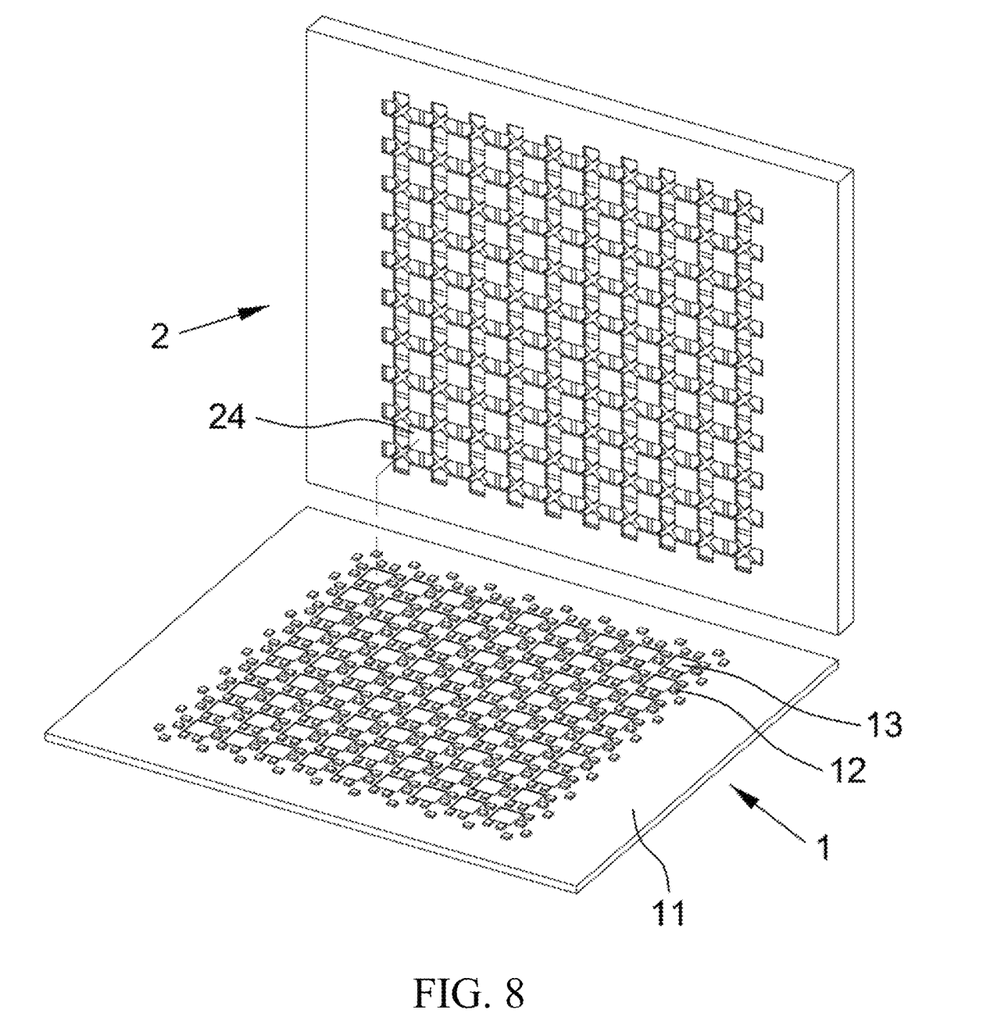
FIG. 8 is a partial three-dimensional exploded view according to a second embodiment of the present invention.

Referring to FIG. 8, the substrate 11 further includes a plurality of positioning recesses 13 corresponding to the plurality of pads 24. In this way, the plurality of pads 24 can be respectively engaged in the plurality of positioning recesses 13. Therefore, an effect of positioning and combining of the separator 2 and the light board 1 can be improved, to avoid collision with the light-emitting element 12 in the X-axis and Y-axis directions.

FIG. 9 is a bottom view of a light-emitting element and a separator according to a second embodiment of a light source module in the present invention. In this embodiment, the light-emitting element 12 does not overlap with the first rib 21 in the Z-axis direction. In this way, the light-emitting element 12 located in the interval space 22 is aligned with the sub-interval space 22a. Therefore, for the text or the pattern emitted by the light source module in the present invention, the light-emitting element 12 aligned with each sub-interval space 22a can be accurately controlled, thereby improving the precision of the image presented by the light source module.

Figure 10:
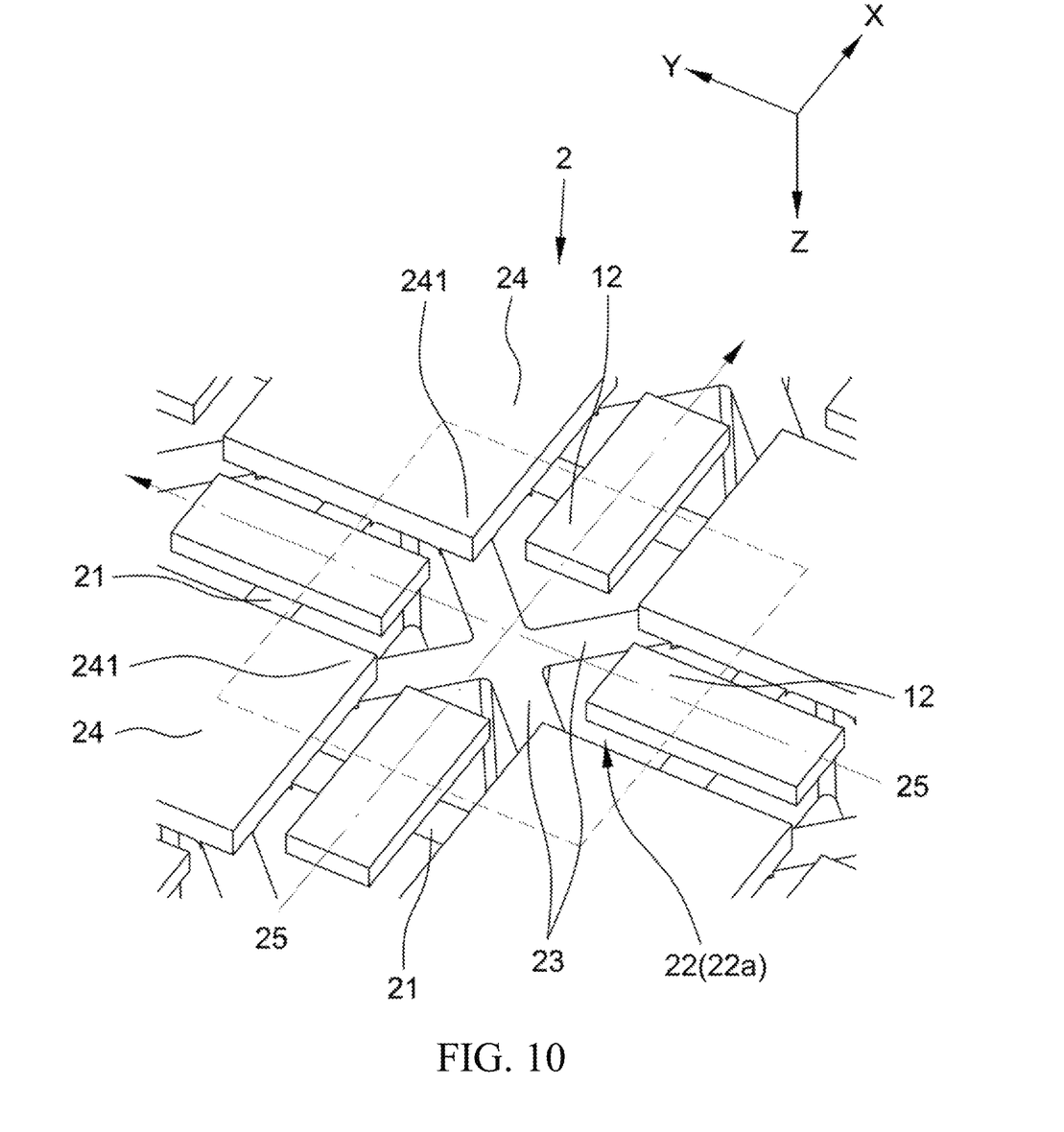
FIG. 10 is a bottom view of a light-emitting element and a separator according to a third embodiment of the present invention.

FIG. 10 is a bottom view of a light-emitting element and a separator according to a third embodiment of a light source module in the present invention. Compared with the second embodiment, a difference is that, in this embodiment, the light-emitting element 12 overlaps with the first rib 21 in the Z-axis direction. In this way, the light-emitting element 12 spans over the first rib 21 in the X-axis direction or in the Y-axis direction. Therefore, the light source module in the present invention may be suitable for use in general displays, while maintaining an effectiveness of each brightness partition and meeting assembly precision requirements.

Referring to FIG. 1 and FIG. 2, the light source module in the present invention may further include a diffuse plate 3 arranged above the separator 2, to improve light source uniformity of the plurality of light-emitting elements 12. To be specific, the separator 2 further includes a positioning bump 26, and the diffuse plate 3 includes a dimple (not drawn in the figure) corresponding to the positioning bump 26. Therefore, the diffuse plate 3 abuts against the positioning bump 26 of the separator 2 through the dimple. In this way, a gap is formed between a bottom surface of the diffuse plate 3 and a top surface of the separator 2, thereby reducing friction between the diffuse plate 3 and the separator 2. In an embodiment, the positioning bump 26 is located in a generally central area of the separator 2, and may be used as a reference point for thermal expansion and contraction of the diffuse plate 3.

When the light source module in the present invention is assembled into a display device, the display device includes the foregoing light source module and a panel. The panel is arranged above the light source module. In this embodiment, the panel is a smart glass.

Based on the above, in the light source module and the display device in the present invention, through a design of wide interval spaces at the bottom of the separator, the plurality of light-emitting elements can be accommodated. In this way, the plurality of light-emitting elements does not collide with the separator, the separator and the light-emitting elements effectively avoid each other in X-axis, Y-axis, and Z-axis directions, and a good brightness partitioning effect can be achieved.

The foregoing disclosed embodiments are merely illustrative of the principles, features, and effects of the present invention, and are not intended to limit the implementable scope of the present invention. Any person skilled in the art may make modifications and changes to the foregoing embodiments without departing from the spirit and scope of the present invention. Any equivalent changes and modifications made by using the present invention shall fall within the following claims.

What is claimed is:

1. A light source module, comprising:
    a light board, comprising a substrate, and a plurality of light-emitting elements arranged at intervals on the substrate; and
    a separator, located above the substrate, and comprising a plurality of first ribs, wherein the plurality of first ribs intersect and connect to each other to form a plurality of interval spaces to accommodate the light-emitting elements, the first rib forming the interval space has an inner wall, a part of the inner wall closer to the substrate is recessed away from the interval space, the inner wall has a first distance farther away from the substrate in a Z-axis direction and has a second distance closer to the substrate, and a projection relationship between the second distance and the first distance onto an XY plane is that the second distance is greater than the first distance;
    wherein the separator further comprises a plurality of pads respectively arranged at the bottom of an intersection between any two first ribs, and the pad has an extension portion extending below the interval space toward the adjacent light-emitting element; and
    wherein the first ribs and the plurality of pads are in contact with the substrate.

2. The light source module according to claim 1, wherein in the interval space, the separator further comprises at least one second rib separating the interval space into a plurality of sub-interval spaces.

3. The light source module according to claim 2, wherein the plurality of sub-interval spaces is in a triangular form.

4. The light source module according to claim 2, wherein the second rib are in contact with the substrate.

5. The light source module according to claim 2, wherein a channel is formed between the plurality of pads to be in communication with at least one of the plurality of interval spaces.

6. The light source module according to claim 1, wherein the substrate comprises a plurality of positioning recesses corresponding to the plurality of pads, and the plurality of pads is respectively engaged in the plurality of positioning recesses.

7. The light source module according to claim 1, wherein the light-emitting element overlaps with the first rib in the Z-axis direction.

8. The light source module according to claim 1, further comprising a diffuse plate arranged above the separator.

9. The light source module according to claim 8, wherein the separator further comprises a positioning bump, the diffuse plate comprises a dimple corresponding to the positioning bump, and the diffuse plate abuts against the positioning bump of the separator through the dimple.

10. A display device, comprising:
the light source module according to claim 1; and
a panel, arranged above the light source module.

* * * * *